D. W. FULTON.
SAW HANDLE.
APPLICATION FILED JUNE 6, 1919.

1,334,444.

Patented Mar. 23, 1920.

Inventor:
Dwight W. Fulton

UNITED STATES PATENT OFFICE.

DWIGHT W. FULTON, OF DAVENPORT, IOWA.

SAW-HANDLE.

1,334,444.   Specification of Letters Patent.   Patented Mar. 23, 1920.

Application filed June 6, 1919. Serial No. 302,116.

*To all whom it may concern:*

Be it known that I, DWIGHT W. FULTON, a citizen of the United States, residing at Davenport, in the county of Scott and State of Iowa, have invented certain new and useful Improvements in Saw-Handles, of which the following is a specification, reference being had therein to the accompanying drawings.

This invention relates to saw handles, and the object of the invention is the construction of a saw handle made in one piece, and which embodies edges or flanges that permit the complete saw to be used as a square or for miter purposes.

Another object of the invention is the construction of a saw, including my improved handle, which saw comprises a minimum number of parts and which is efficient and positive in operation.

With these and other objects in view, my invention comprises certain novel constructions, combinations, and arrangements of parts as will be hereinafter specifically described, illustrated in the accompanying drawings, and more particularly pointed out in the appended claim.

In the drawings,

Fig. 3 is a fragmentary rear view of the saw in a position for use as a square; while

Figure 1:
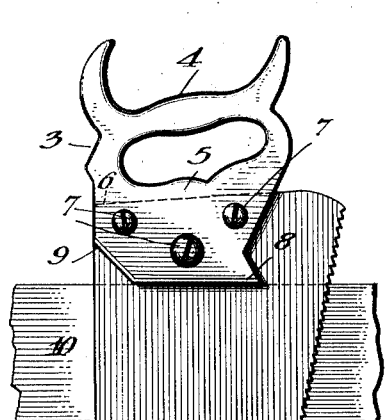
Figure 1 is a view in side elevation of a saw constructed in accordance with the present invention, showing the same in a position to be used as a square.

Referring to the drawings by numerals, 1 designates the blade of the saw, and 2 the rear or untoothed edge thereof.

My improved handle 3 comprises the grip or handhold 4 and body 5. The body 5 is split or bifurcated as at 6 for receiving the upper or inner end of the blade 1. Suitable fastening means, as screws 7, extend through the body 5 and the blade 1 and detachably secure the blade to the handle.

Figure 2:
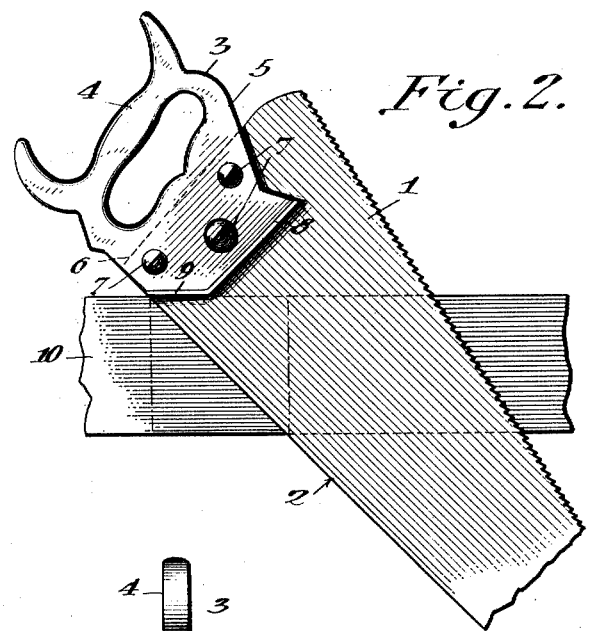
Fig. 2 is a fragmentary view of the saw showing the same used as a miter.
Figure 3:
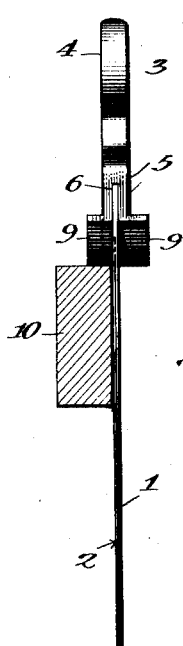
Figure 4:
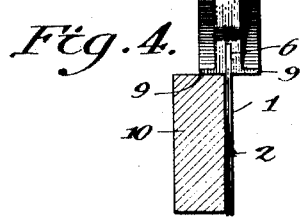
Fig. 4 is a similar view of the saw used as a miter.

The lower or inner end of the body 5 is provided with a flange 8 formed at right angles to the rear edge 2 of the blade 1 so that by reason of this flanged edge 8, the saw can be used as a square (Fig. 1). Formed at an angle to the edge 8 is the miter or flanged edge 9, whereby the saw can be used as a miter (Fig. 2).

It will be understood that the body of the handle 5 is provided with a pair of edges 8 and a pair of edges 9 at opposite sides of the bifurcated portion 6, so that either side or face of blade 1 can be placed against an object when the saw is desired to be used as a square or miter. To increase the efficiency of my improved device, I have flanged the edges 8 and 9 to produce a broader bearing face to engage the work or object 10.

The handle can be cast or made in one piece, including the flanged edges 8 and 9, thereby greatly decreasing the cost of manufacture, and by reason of the single-piece structure of the handle, a very efficient and durable device is produced which cannot easily become broken or weakened as would be the case if it were made in two or more parts and assembled by fastening means prior to placing the same upon a blade.

For the purpose of expressing the terms in perhaps a better form, I may designate in the claim the edge 8 as the "square-edge" and the edge 9 as the "miter-edge".

I wish it to be understood that I reserve the right to make such minor alterations and modifications in the construction of my invention as shall appear to one skilled in the art to which this invention relates, which changes or alterations fairly fall within the scope of the appended claim.

What I claim is:

As a new article of manufacture a one-piece saw-handle comprising a body and a grip portion integral therewith, said body provided in its inner edge with a bifurcated portion, and on its inner edge, with straight broad outwardly-extending flanges at opposite sides of the bifurcated portion, said flanges constituting square-edges, and integral with said square-edges with broad outwardly-extending flanges constituting miter-edges formed at an angle to said square-edges, all of said flanges extending beyond the sides of the body a considerable distance, for affording a greater bearing surface upon the object against which the saw-handle is placed, substantially as is shown and described.

In testimony whereof I hereunto affix my signature.

DWIGHT W. FULTON.